3,413,354
METHOD OF PREPARING ARYL SULFOXIDES
Louis De Vries, Richmond, Calif., assignor to Chevron Research Company, San Francisco, Calif., a corporation of Delaware
No Drawing. Filed Jan. 4, 1966, Ser. No. 518,548
7 Claims. (Cl. 260—607)

ABSTRACT OF THE DISCLOSURE

Diaryl sulfoxides are prepared by condensing sulfur dioxide with an aromatic hydrocarbon in the presence of aluminum chloride-hydrogen chloride catalyst.

---

This invention concerns a novel method for the preparation of diaryl sulfoxides.

Diaryl sulfoxides have for the most part been prepared by oxidizing the analogous thioether. Numerous patents have issued describing the preparation of a variety of diaryl sulfoxides using this route.

It has now been found that hydrocarbon diaryl sulfoxides may be prepared by reacting sulfur dioxide with an aromatic hydrocarbon having at least one unsubstituted annular carbon in the presence of aluminum chloride. Anhydrous hydrogen chloride is added in at least a 1:1 mol ratio of hydrogen chloride to aluminum chloride. By anhydrous is intended no more than traces of water being present.

The reaction is conveniently carried out by combining sulfur dioxide, the aromatic hydrocarbon and aluminum chloride, adding anhydrous hydrogen chloride, sealing the reaction vessel and after sufficient time for the reaction, removing the excess acid and aluminum chloride and isolating the product from the unreacted materials.

The mol ratios of sulfur dioxide to aromatic hydrocarbon may be varied widely, depending on the availability of the materials, the ease of separation, the avoidance of side products, etc. Generally, the mol ratio will be in the range of 10–1:1–10 for the aromatic hydrocarbon to the sulfur dioxide. Usually, since the aromatic hydrocarbon will be the more expensive material, the mol ratio of aromatic hydrocarbon to sulfur dioxide will be in the range of 1:2–5.

The amount of aluminum chloride will generally vary from about 0.1 to 1 mol per mol of the reactant in least molar amount. Since the aromatic hydrocarbon will generally be the reactant present in the smallest amount, the mol ratio of aluminum chloride to aromatic hydrocarbon will generally be in the range of about 0.1–1:1, more usually in the range of about 0.1–0.5:1. The anhydrous hydrogen chloride added may range from 1 to 100 mols per mol of aluminum chloride, more usually from about 25 to 75 mols per mol of aluminum chloride.

The temperatures for the reaction may vary from 0° to 100° C. and is generally a matter of convenience, the higher temperatures giving faster rates. Ambient temperatures may be used. Usually, the temperature will be in the range of about 20° to 50° C.

Autogenous pressures may be used, although higher pressures will generally be employed. Generally, pressures will be in the range of 100 to 1000 p.s.i., and usually the pressure will not exceed 500 p.s.i.

The aromatic hydrocarbon may be of from 6 to 60 carbon atoms, will generally have from 1 to 2 fused or nonfused rings, and may have from 0 to 3 alkyl substituents. Illustrative aromatic nuclei are benzene, biphenyl and naphthalene. Alkyl substituents on the various aromatic rings may vary from 1 to 30 carbon atoms, more usually being from about 1 to 20 carbon atoms, and most usually being lower alkyl. However, for many uses, the longer chain alkyl groups are preferred. Cycloaliphatic radicals may also be used such as cyclohexyl, cyclopentyl, etc. The hydrocarbon substituents are therefore hydrocarbons free of aliphatic unsaturation.

Illustrative aromatic hydrocarbons which may be used are benzene, toluene, xylene, cumene, cymene, dodecyl benzene, octadecyl benzene, tertiary butyl benzene, cyclohexyl benzene, naphthalene, methyl naphthalene, octyl naphthalene, biphenyl, diphenyl methane, diphenyl dimethyl methane, mesitylene, etc. The preferred compounds have only one ring, i.e., benzene derivatives.

With aromatic compounds having two rings, preferably nonfused, the opportunity arises for reaction on both of the rings. Therefore, if only the monosulfoxide is desired, excesses of the aromatic compound should be used as compared to the sulfur dioxide. However, the presence of the two rings permits the formation of polymers having high stability and relatively high melting points. The polymeric materials find a variety of uses in situations where stable high melting materials are desired.

The following example is offered by way of illustration and not by way of limitation.

Into a reaction vessel was introduced 130.5 g. of toluene, 63.6 g. of aluminum chloride and the mixture cooled to about −78° C. To the cooled mixture was then added 90.5 g. of sulfur dioxide and anhydrous hydrogen chloride gas to a pressure of 300 lbs./in.$^2$, the reaction vessel was sealed and allowed to warm to room temperature, being maintained at this temperature with rocking for about 16 hours.

At the end of this time, the vessel was vented and benzene and aqueous hydrochloric acid added. The organic layer was separated, filtered and then washed with base, followed by repeated washing with water until neutral. The mixture was then concentrated and cooled to start crystallization. The addition of pentane provided a crystalline material weighing 16 g. having a melting point of 92° C. The infrared spectrum identified the product as ditolyl sulfoxide.

The present method provides an easy and convenient route to diaryl sulfoxides. Moreover, polymers may be obtained by using bi-functional aromatic compounds. The compounds find use as high temperature solvents, detergents, pesticides, etc.

As will be evident to those skilled in the art, various modifications on this invention can be made or followed, in the light of the foregoing disclosure and discussion, without departing from the spirit or scope of the disclosure or from the scope of the following claims.

I claim:

1. A method of preparing diaryl hydrocarbon sulfoxides, which comprises combining an aryl hydrocarbon free of aliphatic unsaturation having at least one unsubstituted annular carbon with sulfur dioxide in the presence of aluminum chloride and from 1 to 100 mol per mol of aluminum chloride of hydrogen chloride at a temperature in the range of about 0° to 100° C., and then isolating the diaryl sulfoxide, wherein the aluminum chloride is present in amount of from about 0.1 to 1 mol per mol of reactant in least molar amount.

2. A method according to claim 1 wherein said aryl hydrocarbon is monocyclic aryl hydrocarbon.

3. A method according to claim 1 wherein said aryl hydrocarbon has from 1 to 2 non-fused rings and from 0 to 3 lower alkyl substituents.

4. A method according to claim 1, wherein said aryl hydrocarbon is toluene.

5. A method according to claim 1, wherein the mol ratio of aromatic hydrocarbon to sulfur dioxide is in the range of 1:2–5.

6. A method according to claim 1, wherein anhydrous hydrogen chloride is present in an amount of from about 25 to 75 mols per mol of aluminum chloride.

7. A method according to claim 6, wherein said aryl hydrocarbon is toluene.

References Cited

UNITED STATES PATENTS 2,000,061   5/1935   Carr _____ 260—607 XR
2,947,787   8/1960   Flanagan _____ 260—607

OTHER REFERENCES

Thomas "Anhy. Al Chloride Org. Chem." (1941) p. 509.

Berichte, vol. 41, pt. III, p. 3318 (1908).

CHARLES B. PARKER, *Primary Examiner.*

D. R. PHILLIPS, *Assistant Examiner.*